(12) United States Patent
Peterson et al.

(10) Patent No.: US 10,115,979 B2
(45) Date of Patent: Oct. 30, 2018

(54) APPARATUS AND METHOD FOR HEATING A FUEL CELL STACK

(71) Applicant: FORD GLOBAL TECHNOLOGIES, LLC, Dearborn, MI (US)

(72) Inventors: Craig Winfield Peterson, West Bloomfield, MI (US); Hasdi R. Hashim, Ann Arbor, MI (US); Michael W. Degner, Novi, MI (US); Brian Gillespey, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1131 days.

(21) Appl. No.: 14/310,794

(22) Filed: Jun. 20, 2014

(65) Prior Publication Data

US 2014/0302415 A1  Oct. 9, 2014

Related U.S. Application Data

(63) Continuation-in-part of application No. 13/959,242, filed on Aug. 5, 2013.
(Continued)

(51) Int. Cl.
*H01M 4/04* (2006.01)
*H01M 8/04007* (2016.01)
(Continued)

(52) U.S. Cl.
CPC ..... *H01M 8/04037* (2013.01); *B60L 11/1885* (2013.01); *B60L 11/1894* (2013.01); *H01M 8/0491* (2013.01); *H01M 8/0494* (2013.01); *H01M 8/04268* (2013.01); *H01M 8/04365* (2013.01); *H01M 8/04559* (2013.01);
(Continued)

(58) Field of Classification Search
CPC ......... H01M 8/04037; H01M 8/04268; H01M 8/04365; H01M 8/04559; H01M 8/0491; H01M 8/0494; B60L 11/1885; B60L 11/1894
See application file for complete search history.

(56) References Cited

U.S. PATENT DOCUMENTS 6,358,638 B1   3/2002   Rock et al.
7,968,240 B2   6/2011   Hochgraf et al.
(Continued)

FOREIGN PATENT DOCUMENTS

WO   2009126692 A1   10/2009

OTHER PUBLICATIONS

Chinese Office Action and English translation for Application No. 201410099489, dated Apr. 25, 2017, 10 pages.
(Continued)

*Primary Examiner* — Helen Oi K Conley
(74) *Attorney, Agent, or Firm* — Brooks Kushman P.C.; James Dottavio (57) ABSTRACT

An apparatus for heating a fuel cell stack in a cold start mode is provided. The apparatus comprises a fuel cell stack, a power converter, and a controller. The power converter may include a power switch and resistive heating element that is thermally coupled to the fuel cell stack. The controller is configured to activate the power converter, if a temperature is below a predetermined temperature value, to draw current from the fuel cell stack to cause the fuel cell stack to generate heat. Heat from the power converter is also applied to the fuel cell stack.

6 Claims, 5 Drawing Sheets

Related U.S. Application Data (60) Provisional application No. 61/794,728, filed on Mar. 15, 2013.

(51) Int. Cl.
    *H01M 8/0432*     (2016.01)
    *H01M 8/04858*     (2016.01)
    *H01M 8/04828*     (2016.01)
    *H01M 8/04223*     (2016.01)
    *H01M 8/04537*     (2016.01)
    *B60L 11/18*     (2006.01)

(52) U.S. Cl.
    CPC .......... *H01M 2250/20* (2013.01); *Y02T 90/32* (2013.01); *Y02T 90/34* (2013.01)

(56) References Cited

U.S. PATENT DOCUMENTS

| | | |
|---|---|---|
| 2006/0152085 A1 | 7/2006 | Flett et al. |
| 2006/0280977 A1 | 12/2006 | Sakajo et al. |
| 2007/0292724 A1 | 12/2007 | Gilchrist |

OTHER PUBLICATIONS

U.S. Office Action for U.S. Appl. No. 13/959,242, dated Aug. 13, 2015, 7 pages.
U.S. Office Action for U.S. Appl. No. 13/959,242, dated Jan. 29, 2016, 7 pages.
U.S. Office Action for U.S. Appl. No. 13/595,242, dated Jul. 12, 2016, 12 pages.
Examiner's Answer for U.S. Appl. No. 13/959,242, dated Mar. 8, 2017, 11 pages.
Anzicek et al., "Power Converter and Control Interface for a Gem Fuel Cell Vehicle", Proceedings of FUELCELL2005, 2005, pp. 329-333.
Chinese Office Action for Application No. 201510340587.5, dated Sep. 6, 2018, 6 pages.

APPARATUS AND METHOD FOR HEATING A FUEL CELL STACK

CROSS-REFERENCE TO RELATED APPLICATIONS

This application is a continuation-in-part of application Ser. No. 13/959,242, filed Aug. 5, 2013, which claims the benefit of U.S. Provisional Application No. 61/794,728, filed Mar. 15, 2013, the disclosures of which are incorporated in their entirety by reference herein.

TECHNICAL FIELD

Embodiments disclosed herein generally relate to an apparatus and method for heating a fuel cell stack.

BACKGROUND

A fuel cell stack implementation is disclosed in U.S. Publication No. 2007/0292724 ("the '724 publication") to Gilchrist. The '724 publication discloses a power supply system that is operable during a cold-start condition. The power supply system comprises a fuel cell stack that is electrically operable to produce direct current (DC) power and a power conversion system that is electrically coupled to the fuel cell stack and operable to receive DC power from the fuel cell stack. The power supply system further comprises at least one battery electrically coupled to the power conversion system and operable to exchange battery DC power with the power conversion system and a controller that is at least operable to control operation of the power supply system such that at least an amount of pulsating current is supplied to the battery during the cold-start condition.

SUMMARY

A vehicle includes a power converter thermally and electrically coupled to a fuel cell. The fuel cell may be used to power the vehicle. Based on a fuel cell temperature, a controller may be programmed to operate the fuel cell to generate a current which corresponds to a fuel cell voltage less than a normal vehicle operating voltage. Also, the controller may operate the power converter to generate a power converter output voltage at the normal vehicle operating voltage and to draw the current from the fuel cell to increase heat generated within the fuel cell. The heat generated in the power converter may be transferred to the fuel cell stack to minimize a time to heat the fuel cell.

A method for controlling a fuel cell includes operating the fuel cell to begin self-heating and engaging a resistive heating element within a power converter electrically coupled to the fuel cell. The method also includes thermally coupling the resistive heating element to the fuel cell to aid in heating the fuel cell and disengaging the heating when a temperature of the fuel cell reaches a predetermined temperature.

A fuel cell system includes a fuel cell stack thermally and electrically coupled to a power converter, and a controller. Based on a stack temperature being less than a threshold, the controller may be programmed to operate the fuel cell to self-heat by generating a current. The controller may be further programmed to operate the power converter to self-heat by generating an operating voltage. A thermal system is arranged to transfer heat from the power converter to the fuel stack.

BRIEF DESCRIPTION OF THE DRAWINGS

Embodiments of the present disclosure are pointed out with particularity in the appended claims. However, other features of the various embodiments will become more apparent and will be best understood by referring to the following detailed description in conjunction with the accompany drawings in which

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

A fuel cell stack generates electrical power in response to electrochemically converting oxygen and hydrogen. In general, the fuel cell stack includes a plurality of fuel cells that are joined together in which each fuel cell generates a portion of the total amount of electrical current provided by the fuel cell stack. In general, cold starting of the fuel cell stack may require dumping power externally, such as dumping it into a water ethylene glycol (WEG) heater or using a traction motor (or electric powertrain system) in a power waste mode. The WEG heater is used to heat the fuel cell stack during a cold start mode. In some implementations, at least two WEG heaters may be used for enabling the cold start of the fuel cell stack. This condition adds weight to a vehicle for something that may be rarely used in some instances. A cold start operation in connection with the fuel cell stack is generally required when temperature is below 5° C.

The overall heating of the fuel cell stack while in a cold start mode may take a considerable amount of time. This condition may not enable a driver to simply drive away after cold starting the fuel cell stack in the vehicle. Some approaches have attempted to short the fuel cell stack in order to heat the fuel cell stack and to reconnect the fuel cell stack (e.g., remove the short condition) to a vehicle bus for normal fuel cell stack operation after the fuel cell stack is heated to a desired temperature. This solution may be inexpensive to implement. However, since the fuel cell stack is shorted while in the cold start mode, vehicle drive away is not possible. To remove the short state condition, the fuel cell stack must reach the desired temperature. Once the fuel cell stack reaches the desired temperature, the vehicle can then perform the drive away condition.

Embodiments disclosed herein may provide a fuel cell converter including a boost converter, a buck converter, or a buck-boost converter to assist with fuel cell stack heating while in the cold start mode. The converter may be a unidirectional converter or a bi-directional converter. The boost converter allows the fuel cell stack to change output voltage at its desired level while maintaining the optimal voltage on the vehicle side. The heat is generated on the fuel cell stack by exploiting the increase in internal resistance of the fuel cell stack (increasing rate of waste heat production) which occurs when the stack current is increased. For normal fuel cell stack operation, a contactor which forms a portion of the boost converter is closed, thereby bypassing additional electronics within the boost converter which are used to heat the fuel cell stack in the cold start mode. To heat the fuel cell stack in the cold start mode, the contactor is controlled to open, while the additional electronics on the boost converter (e.g., insulated-gate bipolar transistor (IGBT)) is switched to draw current thereby generating heat for the fuel cell stack. This condition provides the driver with the ability to drive away while the boost converter draws current to heat the fuel cell stack. These aspect and others will be described in more detail below.

Figure 1:
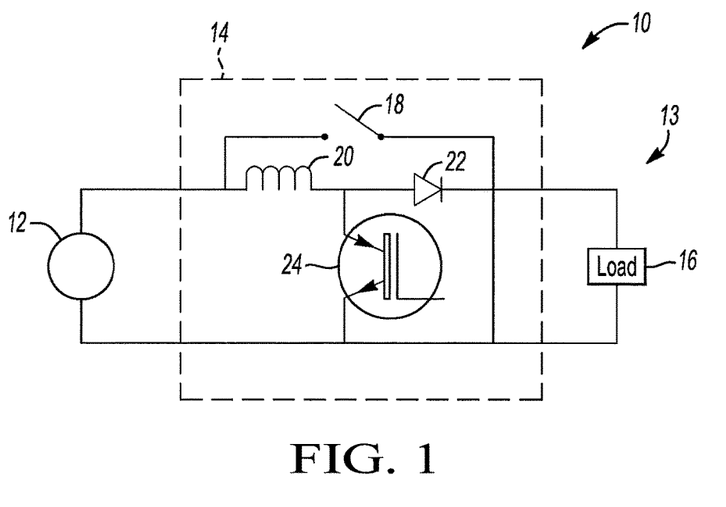
FIG. 1 depicts a first apparatus for heating a fuel cell stack.

FIG. 1 depicts a first apparatus 10 for heating a fuel cell stack 12. The first apparatus 10 includes a boost converter 14 that is operably coupled to a plurality of loads 16. The first apparatus 10 may be implemented in a vehicle 13. The boost converter 14 includes a contactor 18, an inductor 20, a diode 22, and a switching device 24 such as an IBGT or other suitable device. During a normal fuel cell startup condition (e.g., vehicle 13 is being started while exterior temperature to the vehicle 13 is greater than 5° C.), the contactor 18 closes such that the fuel cell stack 12 provides electrical power to the loads 16. When the contactor 18 is closed, the electrical current generated from the fuel cell stack 12 flows through the contactor 18 and around the inductor 20, diode 22, and the switching device 24.

In a cold start mode (e.g., the vehicle 13 is being started while exterior temperature is less than 5° C.), the contactor 18 is open and the fuel cell stack 12 powers the inductor 20, the diode 22, and the switching device 24. In this case, the IGBT 24 generates heat in response to the power from the fuel cell stack 12. A tube (not shown) carrying coolant is positioned about the IGBT 24 such that the coolant is heated therefrom. The tube extends about the fuel cell stack 12 where the heated coolant is used to heat the fuel cell stack 12. In addition, the IGBT 24 powers the loads 16. It is recognized that the loads 16 comprise any number of vehicle related devices which enable the vehicle to drive and/or operate. In the cold start mode, the IGBT 24 may provide enough power to power at least portions of the load 16 to enable a drive away condition during fuel cell stack 12 cold start. This will be discussed in more detail below.

Figure 2:
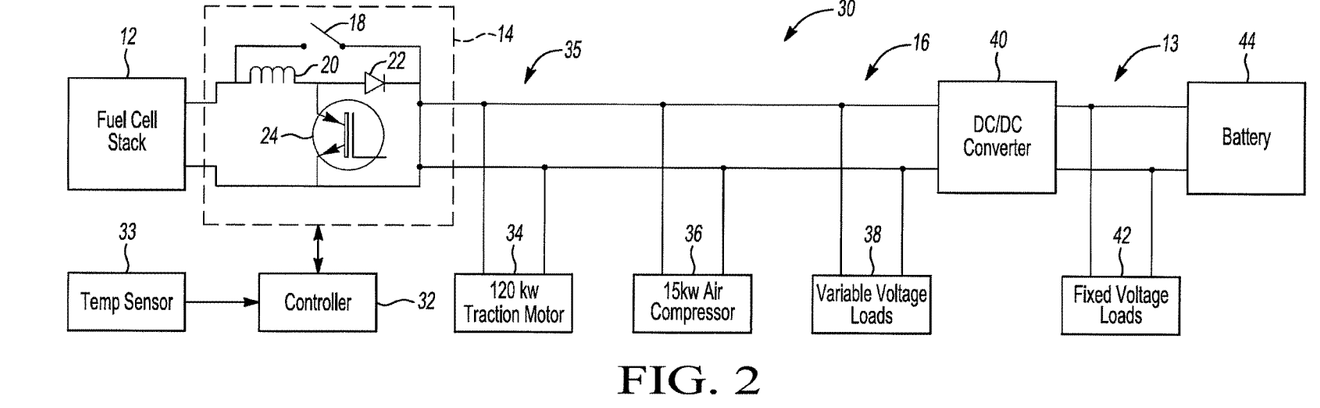
FIG. 2 depicts a second apparatus for heating the fuel cell stack in a high voltage implementation.

FIG. 2 depicts a second apparatus 30 for heating the fuel cell stack 12 in a high voltage implementation. The second apparatus 30 generally includes the fuel cell stack 12, the boost converter 14, a controller 32 and a temperature sensor 33. In general, the controller 32 may control the contactor 18 to open or close based on the particular mode of the fuel cell stack 12. For example, in the event the fuel cell stack 12 is in a normal fuel cell startup condition, then the controller 32 may control the contactor 18 to close thereby allowing electrical power to bypass the IGBT 24 and additional circuitry within the boost converter 14. In this case, various loads 16 such as but not limited to, a traction motor 34, an air compressor (or cathode compressor) 36, variable voltage loads 38 (e.g., an electrical compressor motor or other suitable device that can operate at a voltage that varies from 170 to 450V), a DC/DC converter 40, fixed-voltage loads 42 (e.g., open-loop controlled induction motor), and a battery 44 are powered from the fuel cell stack 12. The controller 32 is configured to receive a signal from the temperature sensor 33 which is indicative of an exterior temperature of the vehicle 13 during vehicle startup. The controller 32 determines that the vehicle 13 is in the normal fuel cell startup condition if the measured temperature exceeds a predetermined temperature level. In this case, the controller 32 then closes the contactor 18 to allow the fuel cell stack 12 to provide power to the loads 16.

In general, the second apparatus 30 may be generally defined as a high voltage fuel cell stack implementation. In this case, the fuel cell stack 12 provides enough electrical current to power the traction motor 34 and the air compressor 36. For example, the fuel cell stack 12 may provide electrical current that provides between 170 and 450V on a vehicle bus 35 for driving the traction motor 34, the air compressor 36, and the variable voltage loads 38.

The traction motor 34 is configured to enable the vehicle 13 to be driven. The air compressor 36 pressurizes an air stream that is delivered to the fuel cell stack 12 to allow the fuel cell stack 12 to generate the electrical current. In one example, the air compressor 36 may need at least 170V to operate for full fuel stack operation. However, the air compressor 36 may still provide enough pressurized air to allow the fuel cell stack 12 to perform drive away (e.g., partial operation in the cold start mode) at a voltage that is less than 170V. This will be discussed in more detail below. As noted above, the fuel cell stack 12 receives air and hydrogen and electrochemically converts the same into the electrical current or power.

In the normal fuel cell startup condition (or normal fuel cell operation), the fuel cell stack 12 may generate electrical power that is stored in the battery 44. In addition, the battery 44 may also power various loads 16 in the vehicle 13. The DC/DC converter 40 is arranged as a boost/buck converter. For example, the DC/DC converter 40 may act as a buck converter and step down the voltage as provided from the fuel cell stack 12 to a voltage that is suitable for storage in the battery 44 and for use by the fixed voltage loads 42. The DC/DC converter 40 when arranged to boost voltage, may step up voltage provided from the battery 44 to power the fraction motor 34, the air compressor 36, and the variable voltage loads 38.

In the event the controller 32 determines that the temperature is below the predetermined temperature value (e.g., 5° C.) during vehicle startup based on information received from the temperature sensor 33, the controller 32 determines that the fuel cell stack 12 is experiencing a cold start (e.g., the vehicle is in the cold start mode).

If the temperature falls below 5° C. and the vehicle 13 is started to operate (e.g., fuel cell stack 12 experiences a cold start), then the controller 32 controls the contactor 18 to open thereby allowing the fuel cell stack 12 to apply power to the inductor 20, the diode 22, and the IGBT 24. The IGBT 24 provides heat in response to generating current which is provided to the fuel cell stack 12 for heating the same. In this case, the IGBT 24 provides enough power (or an adequate voltage level) to activate the DC/DC converter 40. For example, the DC/DC converter 40 may have a minimum operating voltage range of between 125-150V. The boost converter 14 in conjunction with the DC/DC converter 40 provides enough voltage (e.g., at least 125 V) and power to operate the loads 16 (including the traction motor 34 and the air compressor 36) to perform driveway in the cold start mode. The DC/DC converter 40 may also boost the voltage from the battery 44 to power the traction motor 34 and the air compressor 36 to allow a driver the ability to perform a driveway.

It is recognized that the temperature plays a role in the driver's ability to driveway. For example, the colder the temperature, then the longer it takes for the vehicle 13 to perform the drive away. For example, in the event the temperature is −15° C., then it may take approximately twenty to thirty seconds to perform the drive away operation. In another example, in the event the temperature is −40° C., then it may take approximately 1.5 minutes to perform the drive away condition. In the cold start mode, the boost converter 14 generally provides enough heat to heat the fuel cell stack 12 and enough voltage to power the devices on the bus 35 in order to enable the driver to drive away. Once the temperature of the fuel cell stack 12 reaches a predetermined level, then the controller 32 controls the contactor 18 to close thereby deactivating the IGBT 24. At that point, increased levels of voltage are then provided by the fuel cell stack 12 to power the various loads 16 on the vehicle bus 35.

Figure 3:
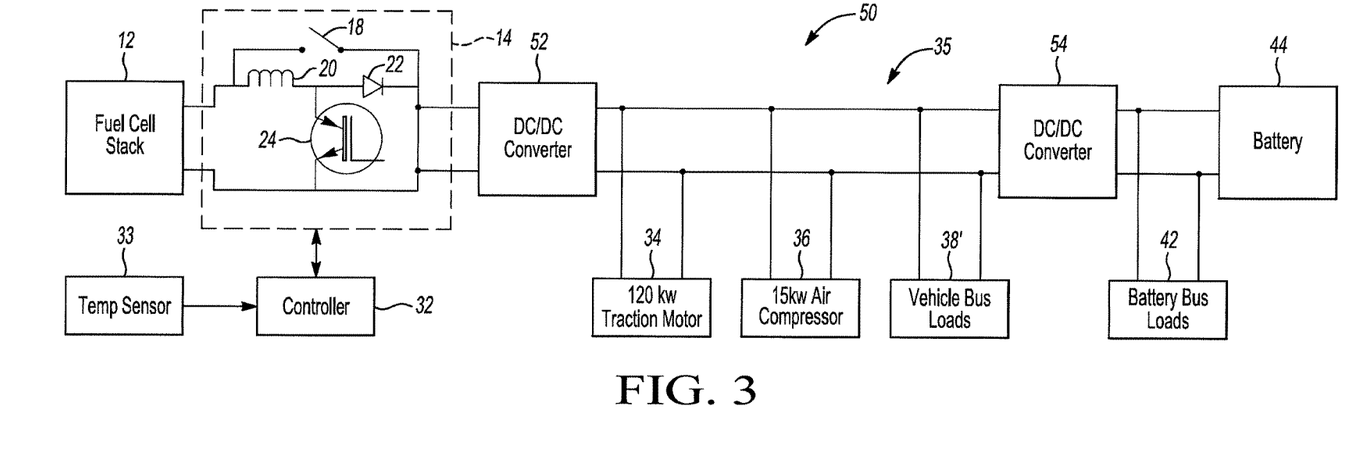
FIG. 3 depicts a third apparatus for heating the fuel cell stack in a low voltage implementation.

FIG. 3 depicts a third apparatus 50 for heating the fuel cell stack 12 in a low voltage implementation. In general, the third apparatus 50 may be generally defined as a low voltage fuel cell stack implementation. The third apparatus 50 includes a first DC/DC converter 52 and a second DC/DC converter 54 which takes the place of the DC/DC converter 40 as noted in connection with FIG. 2. In addition, the third apparatus 50 includes additional vehicle bus loads 38' (e.g., loads that require a higher voltage amount from the vehicle bus 35 such as the traction motor 34) and battery bus loads 42' (e.g., loads that require a lower voltage amount when compared to the voltage from the vehicle bus 35) from the battery 44 such as, for example, an air-conditioning compressor motor).

The fuel cell stack 12 is generally configured to provide a lower voltage amount (e.g., 250V) than that of the fuel cell stack 12 as noted in connection with FIG. 2. As such, while the contactor 18 is closed in the normal fuel cell operation mode, the first DC/DC converter 52 acts a boost converter and boosts up the 250V to reach 350V to 400V on the vehicle bus 35. Such a boosted voltage on the vehicle bus 35 powers the traction motor 34 and the air compressor 36 in a normal operating mode. Additionally, the additional vehicle bus loads 38' also utilize a voltage between 350 to 400V. The second DC/DC converter 54 may then act as a buck converter and step down the voltage on the vehicle bus 35 to a voltage that is suitable for storage on the battery 44 and for powering the battery bus loads 42'.

In the cold start mode, the controller 32 controls the contactor 18 to open thereby allowing the fuel cell stack 12 to apply power to the inductor 20, the diode 22, and the IGBT 24. The IGBT 24 provides heat to the fuel cell stack 12 for heating the same. In this case, the IGBT 24 provides enough power (or an adequate voltage level) to activate the first DC/DC converter 52. The first DC/DC converter 52 may have a minimum operating voltage range of between 125-150V. In this case, the IGBT 24 provides electrical current which is adequate to provide the minimum amount of voltage to the first DC/DC converter 52 to enable the same to operate. The first DC/DC converter 52 may then boost the voltage from the fuel cell stack 12 to power the traction motor 34 and the air compressor 36 to allow a driver the ability to perform a driveway. The second DC/DC converter 54 may then operate based on the voltage on the vehicle bus 35. In other words, the second DC/DC converter 54 is powered by the voltage on the vehicle bus 35 which remains constant and the voltage on the bus 35 is provided from the output of the first DC/DC converter 52, while the first DC/DC converter 52 receives a voltage of at least 125V or some other minimum voltage.

Figure 4:
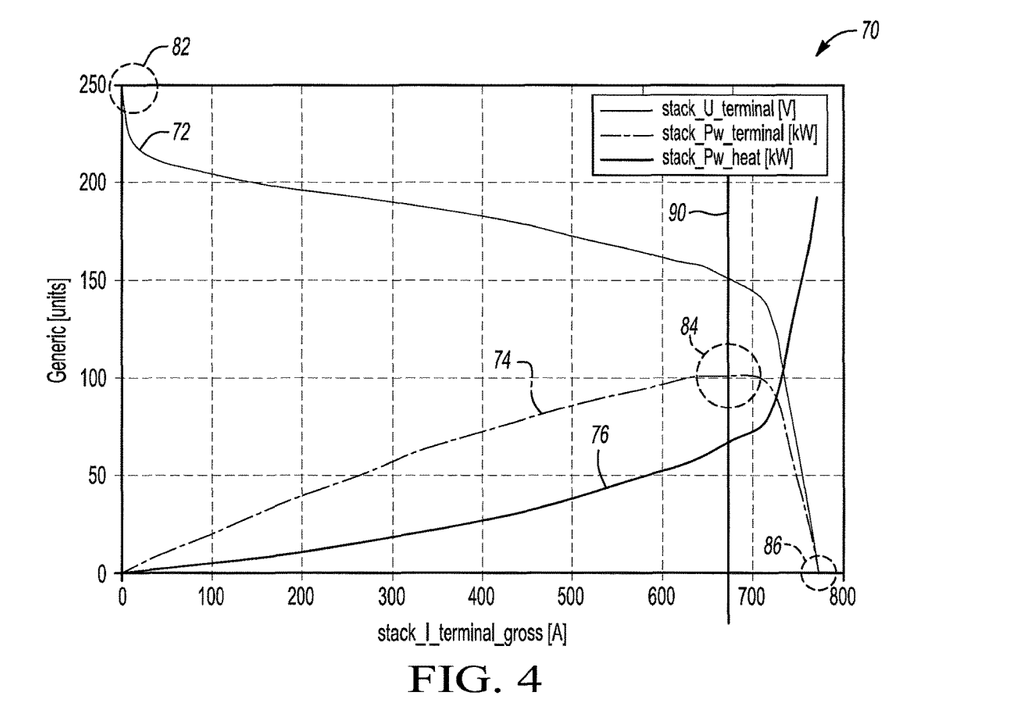
FIG. 4 is a plot depicting various electrical characteristics associated with the fuel cell stack.

FIG. 4 is a plot 70 depicting various electrical characteristics associated with the fuel cell stack 12 (e.g., in the y-axis) as a function of an output current from the fuel cell stack 12 (e.g., in the x-axis). The plot 70 illustrates a first waveform 72 that generally corresponds to voltage at terminals of the fuel cell stack 12. The plot 70 further illustrates a second waveform 74 that generally corresponds to power delivered to the vehicle 13, which is calculated by multiplying the voltage of the fuel cell stack 12 with the output current of the fuel cell stack 12. The plot 70 illustrates a third waveform 76 that generally corresponds to an amount of heat that is provided internally within the fuel cell stack 12.

As generally shown at 82, the first waveform 72 illustrates that the fuel cell stack 12 is at an open circuit voltage (OCV) (e.g., 250 V) and the IGBT 24 is at 0% duty cycle. The second waveform 74 illustrates that as the output current is increased, the power delivered to the vehicle 13 increases while the voltage of the first waveform 72 decreases. In this case, the IGBT 24 increases in terms of its duty cycle resulting in an increase in output current which also causes the voltage at the fuel cell stack 12 to decrease. When the IGBT 24 is at 100% duty cycle, the output current is at a maximum (e.g., around 770 A), but the voltage at the fuel cell stack 12 has dropped to 0V.

As generally shown at 84, this condition is indicative of the maximum power available from the fuel cell stack 12 (e.g., the maximum power that can be delivered from fuel cell stack 12 to the loads 16, which will increase as the fuel cell stack 12 warms up. In the second waveform 74, the power delivered to the vehicle peaks at around 675 A (which corresponds to a certain X duty cycle for the IGBT 24) then the power delivered decreases. As generally shown at 86, the power delivered drops back to zero when the IGBT 24 is at 100% duty cycle. The vertical line 90 on the plot 70 that crosses 675 A on the x-axis corresponds to when the IGBT 24 is at X duty cycle and the power delivered to the vehicle 13 is at its peak, or a maximum duty cycle. By modulating the duty cycle of the IGBT 24 from X to 100% (e.g., operating the fuel cell stack 12 on the right side of vertical line 90), the fuel cell stack 12 will generate more heat as exhibited in waveform 76 than by modulating the duty cycle of IGBT 24 from 0% to X (e.g., operating the fuel cell stack 12 on the left side of the vertical line 90) for the same power delivered to the vehicle 13 as exhibited in the second waveform 74.

Figure 5:
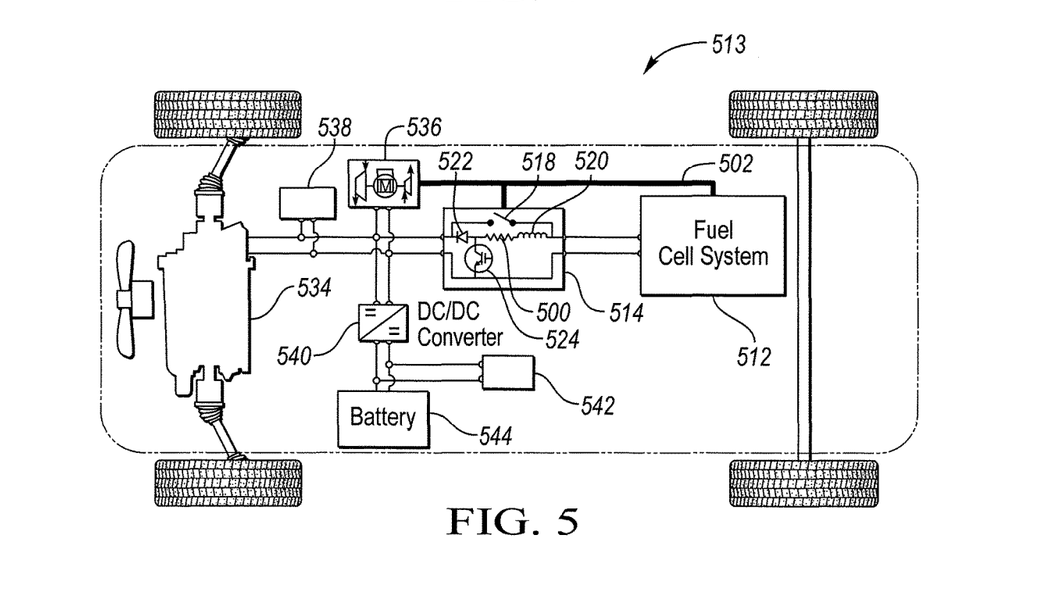
FIG. 5 depicts a vehicle with a fourth apparatus for heating the fuel cell stack in a high voltage implementation.

FIG. 5 depicts a vehicle with a fourth apparatus for heating the fuel cell stack, fuel cell system or fuel cell 512 in a high voltage implementation. The fourth apparatus generally includes the fuel cell 512, the compressor 536, the power converter or converter 514 which may include a boost convert, a buck converter, a buck-boost converter and may be configured to operate uni-directionally or bi-directionally. The converter 514 may be used to boost the voltage of the fuel cell 512 to a normal fuel cell stack operating voltage, which may be the vehicle normal operating voltage, during a freeze start or cold start. The fourth apparatus also generally includes a thermal channel 502 coupling the fuel cell 512 with the converter 514 which may also be coupled to the compressor 536. In general, the fourth apparatus is controlled by the controller 532 (not shown) which may control the contactor 518 to open or close based on the particular mode of the fuel cell 512. For example, in a cold start mode (e.g., the vehicle 13 is being started while exterior temperature is less than 5° C.), the contactor 518, which may be a normally open contactor or a normally closed contactor, is opened and the fuel cell 512 powers the inductor 520, the diode 522, the switching device 524 and a resistive heating element 500. In this case, the switching device 524 (e.g IGBT, BJT, MOSFET, or relay) generates heat in response to power flowing from the fuel cell 512 through the switch 524 when the switch is closed. The heat generated by the switching device 524 may be thermally coupled to the fuel cell stack 512 with a thermal channel 502 to aid in heating the stack 512. If the stack is cold, it is desirable to apply a load to draw current from the fuel cell stack 512 at a defined voltage such that the exothermic nature of the fuel cell reaction is used to self-heat the fuel cell stack 512. The load of a standard converter may not be ideal for self-heating and an increased load may be desirable to apply to the fuel cell stack 512 to maintain the stoichiometry to the current draw for efficient use of the fuel consumed by the cell fuel 512 to generate heat. During operation of the fuel cell 512, the chemical reaction that generates current is an exothermic reaction, which causes the fuel cell stack 512 to self-heat, thus an increase in the current demand from the fuel cell stack 512, results in an increase in exothermically generated heat within the fuel cell stack 512.

The resistive heating element 500 may be constructed of a metallic, composite, ceramic (PTC) or other suitable material. The resistive heating element 500 may be sized, (i.e. have a resistance and current carrying capability) to load the fuel cell such that it reduces the fuel cell voltage. There is more heat produced by the fuel cell 512 per gram of $H^2$ when the voltage is lowered. A benefit of the resistive heating element 500 is that the resistive heating element may generate heat when absorbing the energy from the fuel cell, the heat generated may be thermally coupled with the fuel cell 512 to provide additional heat. The resistive heating element 500 may be coupled to a thermal channel 502 such that the heat generated is carried from the resistive heating element 500 to the fuel cell 512 via thermal coupling. The thermal coupling (e.g. a wet coolant tube) may carry a coolant flowing about the IGBT 524 and the resistive heating element 500 such that the coolant is heated therefrom. The thermal channel may extend about the fuel cell 512 where the heated coolant is used to heat the fuel cell 512. In addition, the converter 514 powers the loads including a traction or propulsion motor 534, compressor 536, and vehicle bus loads 538. The converter may also power a secondary power converter 540 which may be used to boost or buck the voltage to interface with a secondary battery 544 and battery bus loads 542 coupled to the battery 544. It is recognized that the loads comprise any number of vehicle related devices which enable the vehicle to drive and/or operate. In the cold start mode, the voltage from the fuel cell 512 may be bucked or boosted by the modulation of the IGBT 524 to provide enough power to power at least portions of the load to enable a drive away condition during fuel cell 512 cold start.

Figure 6:
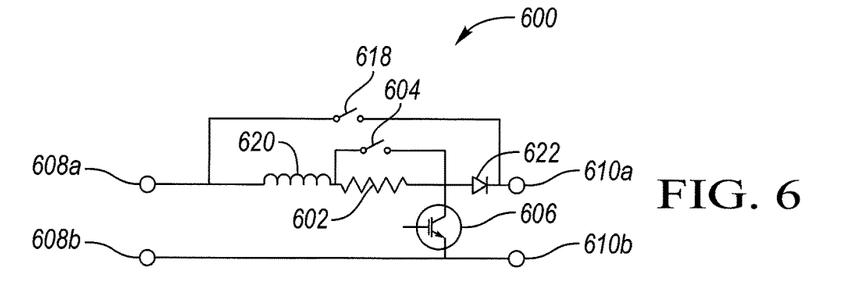
FIG. 6 depicts a fifth apparatus for heating a fuel cell stack.

FIG. 6 depicts a fifth apparatus for heating a fuel cell stack. The fifth apparatus is a converter 600, more specifically a boost converter with the heating element 602. For example, the heating element 602 may be connected between the inductor 620 and the diode 622, (as shown). In this example, the heating element may be selectively engaged using a switch 604. When the switch 604 is open, current from the inductor flows though the heating element 602 generating heat which may be thermally channeled to the fuel cell 612. When the switch 604 is closed, the heating element 602 is shorted and generally current does not flow through the heating element 602 such that heat is not generated from the heating element 602. The heating element 602 is shown connected between the inductor 620 and the switching device 606, but may be connected between the switching device 606 and the diode 622 such that the when the switch 606 is closed, the inductor is connected between the inputs of the converter 608, while the resistive heating element 602 and diode 622 are connected between the outputs of the converter 610. The heating element 602 may be also be positioned across the inputs to the converter 608 such that the switch 604 and the heating element 602 are in series, or positioned across the outputs of the converter 610 such that the switch 604 and the heating element 602 are in series.

Figure 7:
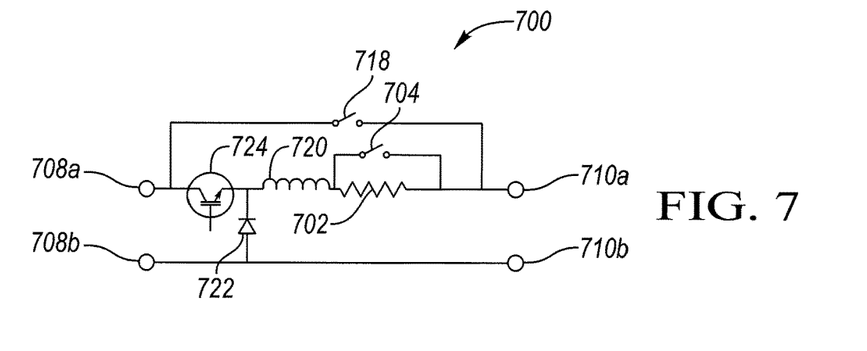
FIG. 7 depicts a sixth apparatus for heating a fuel cell stack.

FIG. 7 depicts a sixth apparatus for heating a fuel cell stack. The sixth apparatus is a converter 700, more specifically a buck converter with the heating element 702. For example, the heating element 702 may be connected between the inductor 720 and the converter outputs, (as shown). In this example, the heating element may be selectively engaged using a switch 704. When the switch 704 is open, current from the inductor flows though the heating element 702 generating heat which may be thermally channeled to the fuel cell 712. When the switch 704 is closed, the heating element 702 is shorted and generally current does not flow through the heating element 702 such that heat is not generated from the heating element 702. The heating element 702 is shown connected between the inductor 720 and the converter outputs, but may be connected between the converter inputs and the switching device 724 such that the when the switch 724 is closed, the heating element 702, switch 724 and diode 722 are connected between the inputs of the converter 708. The heating element 702 may be also be positioned across the inputs to the converter 708 such that the switch 704 and the heating element 702 are in series (not shown), or positioned across the outputs of the converter 710 such that the switch 704 and the heating element 702 are in series (not shown).

Figure 8:
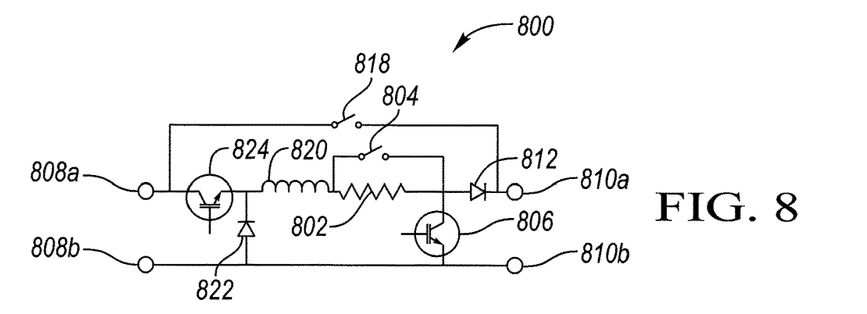
FIG. 8 depicts a seventh apparatus for heating a fuel cell stack.

FIG. 8 depicts a seventh apparatus for heating a fuel cell stack. The seventh apparatus is a converter 800, more specifically a buck-boost converter with the heating element 802. In this example, the heating element 802 may be connected between the inductor 820 and the diode 822, (as shown). This example illustrates that the heating element may be selectively engaged using a switch 804. When the switch 804 is open, current from the inductor flows though the heating element 802 generating heat which may be thermally channeled to the fuel cell 812. When the switch 804 is closed, the heating element 802 is shorted and generally current does not flow through the heating element 802 such that heat is not generated from the heating element 802. The heating element 802 is shown connected between the inductor 820 and a switching device 806, which may be an IGBT, BJT, MOSFET, relay or other suitable device, but may be connected between the switching device 824 and the diode 822 such that the when the switch 824 is closed, the heating element 802 and diode 822 are in series connected between the inputs of the converter 808. The heating element 802 may be also be positioned across the inputs to the converter 808 such that the switch 804 and the heating element 802 are in series (not shown), or positioned across the outputs of the converter 810 such that the switch 804 and the heating element 802 are in series (not shown).

Figure 9:
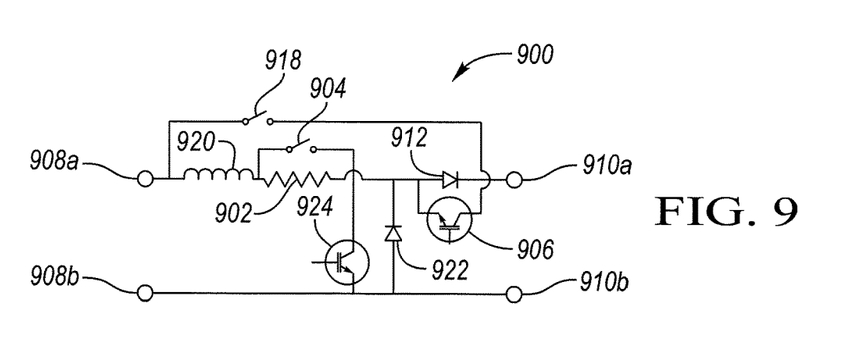
FIG. 9 depicts an eighth apparatus for heating a fuel cell stack.

FIG. 9 depicts an eighth apparatus for heating a fuel cell. The eighth apparatus is a converter 900, more specifically a bi-directional buck/boost converter with the heating element 902. In this example, the heating element 902 may be connected between the inductor 920 and the diode 922, (as shown). In this example, the heating element may be selectively engaged using a switch 904. When the switch 904 is open, current from the inductor flows though the heating element 902 generating heat which may be thermally channeled to the fuel cell 912. When the switch 904 is closed, the heating element 902 is shorted and generally current does not flow through the heating element 902 such that heat is not generated from the heating element 902. The heating element 902 is shown connected between the inductor 920 and the switching device 924, but may be connected between the switching device 924 and the diode 922 such that the when the switch 924 is closed, the inductor is connected between the inputs of the converter 106, while the resistive heating element 902 and diode 922 are connected between the outputs of the converter 910. The heating element 902 may be also be positioned across the inputs to the converter 908 such that the switch 904 and the heating element 902 are in series (not shown), or positioned across the outputs of the converter 910 such that the switch 904 and the heating element 902 are in series (not shown).

Figure 10:
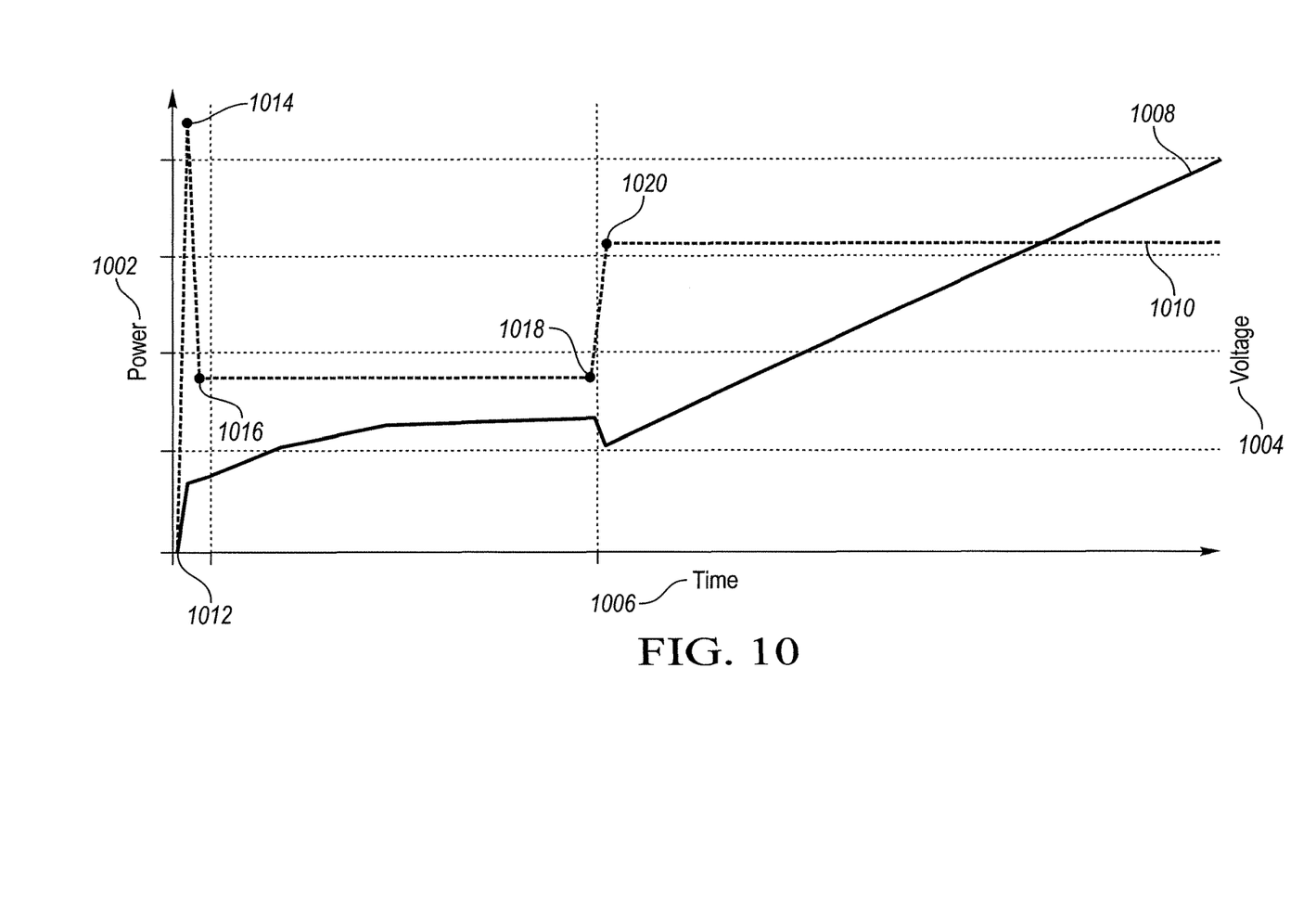
FIG. 10 is a plot depicting various electrical characteristics associated with the fuel cell stack.

FIG. 10 is a plot depicting various electrical characteristics associated with the fuel cell stack. This illustrates an example of power 1002 and voltage 1004 with respect to time 1006 for a fuel cell cold start as applied to FIG. 5. This method is not limited to FIG. 5 and can be implemented in any embodiment described herein. When fuel cell vehicle operation is initiated with a fuel cell temperature below a predetermined temperature, the fuel cell is electrically disconnected from the converter 514. Then the high voltage battery 544 may be used to power low voltage vehicle loads 542, high voltage vehicle loads 538 and a compressor 536 to begin the flow of air to the fuel cell 512 to begin fuel cell operation. As the fuel cell operation begins a fuel cell power 1008 and fuel cell voltage 1010 increase from the initial point from 1012 until it reaches a predetermined voltage 1014 (this can be the maximum fuel cell open circuit voltage or a lower voltage level). Upon reaching the predetermined open circuit voltage 1014, a load is applied to the fuel cell 512 (e.g. the fuel cell 512 is electrically connected to the converter 514 and the resistive heating element 500). At this point the fuel cell voltage 1010 drops down to a low voltage operation point 1016 (an example low voltage would be 100-150 volt operation with a fuel cell having a 250-400 volt normal operating voltage). The load applied to the fuel cell may include the resistive heating element 500, the converter 514, the air compressor 536, the traction motor 534, low voltage vehicle loads 542, high voltage vehicle loads 538 and the high voltage battery 544. The fuel cell operation would be balanced such that stoichiometry for fuel cell operation is maintained while the loads are controlled to maintain voltage and power to facilitate fuel cell self-heating along with thermally coupling heat from the converter 514 and heating element 500 to the fuel cell. During this operation, the fuel cell power 1008 would continue to increase as the fuel cell warms up. When the stack power reaches a threshold power level corresponding to the time of 1018, the fuel cell operating voltage is increased from the low voltage level at 1018 to the fuel cell normal operating voltage at 1020. At this point, the vehicle is drive away capable and can operate from the fuel cell 512 and the high voltage battery 544.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a fuel cell stack for powering the vehicle;
a power converter coupled to the stack, wherein the power converter includes a power switch and a resistive heating element;
a thermal system configured to transfer heat from the power converter to the fuel cell stack; and
a controller programmed to, in response to a stack temperature being less than a threshold, operate the fuel cell stack to generate a current which corresponds to a fuel cell voltage less than a normal vehicle operating voltage and operate the power converter to (i) generate a power converter output voltage at the normal vehicle operating voltage and (ii) draw the current from the fuel cell stack to increase heat generated within the fuel cell stack and to generate heat in the power converter to minimize a time to heat the fuel cell stack to the threshold, wherein the controller is further selectively programmed to bypass the resistive heating element and boost a fuel cell voltage to an operating voltage of a traction motor to enable the vehicle to drive away while heating the fuel cell stack.

2. The vehicle of claim 1, wherein the resistive heating element is selectively engageable.

3. The vehicle of claim 1, wherein operating the power converter includes modulating the power switch at a duty cycle greater than a max power duty cycle.

4. The vehicle of claim 1, wherein operating the power converter includes modulating the power switch at a duty cycle within a range of duty cycles such that a further increase of the duty cycle results in a decrease in power output of the fuel cell stack to heat the fuel cell stack.

5. The vehicle of claim 1, wherein the power converter is a boost converter, a buck converter, or a buck-boost converter.

6. The vehicle of claim 5, wherein the power converter is a bi-directional converter.

* * * * *